(12) United States Patent
Cho et al.

(10) Patent No.: US 8,349,487 B2
(45) Date of Patent: Jan. 8, 2013

(54) FUEL CELL CARTRIDGE HAVING RESIDUAL FUEL MEASURING UNIT AND METHOD OF MEASURING RESIDUAL FUEL OF FUEL CELL SYSTEM HAVING THE SAME

(75) Inventors: Hye-jung Cho, Yongin-si (KR);
Young-Jae Kim, Yongin-si (KR);
Young-soo Joung, Yongin-si (KR);
Jae-yong Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1513 days.

(21) Appl. No.: 11/856,291

(22) Filed: Sep. 17, 2007

(65) Prior Publication Data

US 2008/0070069 A1    Mar. 20, 2008

(30) Foreign Application Priority Data

Sep. 15, 2006   (KR) ........................ 10-2006-0089648

(51) Int. Cl.
*H01M 2/00*         (2006.01)

(52) U.S. Cl. ........................................................ 429/163
(58) Field of Classification Search ................... 429/163
See application file for complete search history.

(56) References Cited

U.S. PATENT DOCUMENTS

| | | | | |
|---|---|---|---|---|
| 2002/0197522 A1* | 12/2002 | Lawrence et al. | ............... | 429/34 |
| 2004/0175602 A1* | 9/2004 | Tahara | ............... | 429/23 |
| 2006/0243045 A1* | 11/2006 | Curello et al. | ............... | 73/149 |

FOREIGN PATENT DOCUMENTS

| | | |
|---|---|---|
| JP | 2005-071713 | 3/2005 |
| JP | 2006-252812 | 9/2006 |

\* cited by examiner

*Primary Examiner* — Lore Jarrett
(74) *Attorney, Agent, or Firm* — Lee & Morse, P.C.

(57) ABSTRACT

A fuel cell cartridge includes a fuel pouch to store fuel, the fuel pouch including a fuel outlet; a pressing unit to press the fuel pouch; a variable resistor provided near the fuel pouch; a sensor provided on the pressing unit to read a resistance value of the variable resistor; and a contact pad to transmit an output voltage determined by the resistance value outside the fuel cell cartridge.

22 Claims, 4 Drawing Sheets

FUEL CELL CARTRIDGE HAVING RESIDUAL FUEL MEASURING UNIT AND METHOD OF MEASURING RESIDUAL FUEL OF FUEL CELL SYSTEM HAVING THE SAME

CROSS-REFERENCE TO RELATED APPLICATION

This application claims the benefit of Korean Patent Application No. 2006-89648 filed on Sep. 15, 2006, in the Korean Intellectual Property Office, the disclosure of which is incorporated herein by reference in its entirety.

BACKGROUND OF THE INVENTION

1. Field of the Invention

Aspects of the invention relate to a fuel cell, and more particularly, to a fuel cell cartridge having a residual fuel measuring unit and a method of measuring the residual fuel of a fuel cell system having the fuel cell cartridge.

2. Description of the Related Art

A fuel cell system includes a fuel cell main body where electricity is generated and a fuel cell cartridge supplying fuel to the fuel cell main body. To secure stability and reliability of the fuel cell system, fuel must be stably supplied from the cartridge to the fuel cell main body regardless of the state of the cartridge. To this end, the residual fuel in the cartridge needs to be accurately measured.

When the fuel cell system is portable, the environment surrounding the cartridge can frequently change. For example, the orientation, temperature, and/or vibration of the cartridge can frequently change while the fuel cell system is being operated. Even when the environment surrounding the cartridge changes frequently, the residual fuel in the cartridge needs to be accurately measured. In addition, since the accuracy and reliability of the fuel supply must be maintained, it is preferable that a fuel measuring operation not affect the fuel supply.

Also, when the residual fuel in the cartridge is accurately measured, the fuel cell system can be efficiently operated. For example, by accurately measuring the residual fuel in the cartridge, the time for replacing the cartridge can be accurately estimated and the fuel supply amount can be optimally controlled. For this purpose, the measured residual fuel in the cartridge needs to be transmitted in real time to a control portion of the fuel cell system. A unit for measuring the residual fuel in the cartridge needs to directly transmit a signal to the control portion of the fuel cell system.

Also, in terms of space efficiency, the cartridge needs to store as much fuel as possible in as small a volume as possible. The maximum volume of a fuel storage portion of the cartridge cannot be greater than the overall volume of the cartridge. Thus, it is important to minimize the volume of other portions of the cartridge excluding the fuel storage portion in the cartridge, such as the fuel supplying portion and the residual fuel measuring portion.

Although a variety of fuel cell systems have been introduced, most cartridges provided in the fuel cell systems hardly satisfy the above-described.

SUMMARY OF THE INVENTION

To solve the above and/or other problems, aspects of the invention relate to a fuel cell cartridge that can accurately measure an amount of residual fuel in the fuel cell cartridge regardless of the environment in which the fuel cell cartridge is used, without affecting a process of pressing a fuel pouch of the fuel cell cartridge, transmit a residual fuel amount measured in real time directly to a control portion of fuel cell main body on which the fuel cell cartridge is installed, and efficiently reduce a volume of the fuel cell cartridge with a simple structure.

Aspects of the invention also relate to a method of measuring an amount of residual fuel in a fuel cell system including the fuel cell cartridge described above and a fuel cell main body on which the fuel cell cartridge is installed.

According to an aspect of the invention, a fuel cell cartridge includes a fuel pouch to store fuel, the fuel pouch including a fuel outlet; a pressing unit to press the fuel pouch; a variable resistor provided near the fuel pouch; a sensor provided on the pressing unit to read a resistance value of the variable resistor; and a contact pad to transmit an output voltage determined by the resistance value outside the fuel cell cartridge.

According to an aspect of the invention, the pressing unit may include a pressing plate contacting a surface of the fuel pouch; and a spring biased against the pressing plate.

According to an aspect of the invention, the spring applies a force to the pressing plate that causes the pressing plate to move as an amount of residual fuel in the fuel pouch changes. The sensor provided on the pressing plate moves with the pressing plate as the pressing plate moves as the amount of residual fuel in the fuel cell changes.

According to an aspect of the invention, the sensor may be a probe sensor contacting the variable resistor.

According to an aspect of the invention, a method of measuring an amount of residual fuel in a fuel cell system including the fuel cell cartridge described above and a fuel cell main body on which the fuel cell cartridge is installed, the fuel cell main body including a control portion, includes applying a voltage to the variable resistor; reading a resistance value of the variable resistor using the sensor while the voltage is applied to the variable resistor; determining an output voltage from the read resistance value of the variable resistor; and transmitting the output voltage to the fuel cell main body through the contact pad.

According to an aspect of the invention, the method may further include determining the amount of residual fuel by comparing the output voltage with residual fuel data stored in the control portion of the fuel cell main body, or in a separate data storing portion controlled by the control portion of the fuel cell main body.

According to an aspect of the invention, the determining of the amount of residual fuel may include generating a voltage signal indicating that the fuel of the fuel cell cartridge is used up when the read resistance value is a minimum resistance.

According to an aspect of the invention, the determining of the amount of residual fuel may include generating a voltage signal indicating that the fuel of the fuel cell cartridge is full when the read resistance value is a maximum resistance.

According to an aspect of the invention, a fuel cell cartridge installable on a fuel cell main body of a fuel cell system includes a fuel pouch to store fuel and supply the fuel to the fuel cell main body during operation of the fuel cell system when the fuel cell cartridge is installed on the fuel cell main body; and an element coupled to the fuel pouch and having a characteristic that changes as an amount of residual fuel in the fuel pouch changes so as to provide real-time measurement of the amount of residual fuel.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
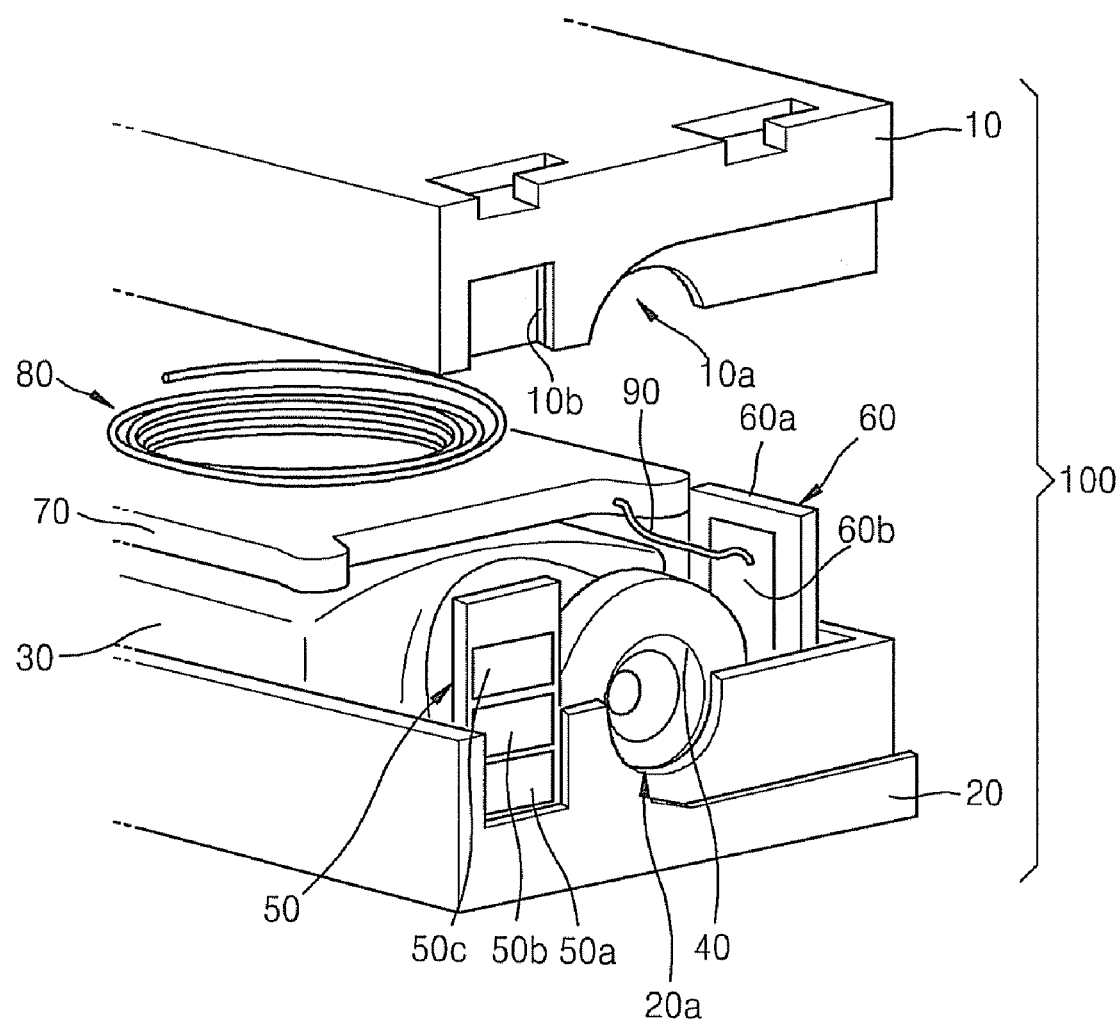
FIG. 1 is a perspective view of a fuel cell cartridge according to an aspect of the invention.

Reference will now be made in detail to embodiments of the invention, examples of which are shown in the accompanying drawings, wherein like reference numerals refer to like elements throughout, and thicknesses of layers and regions are exaggerated for clarity. The embodiments are described below in order to explain the invention by referring to the figures.

FIG. 1 is a perspective view of a fuel cell cartridge 100 according to an aspect of the invention. Referring to FIG. 1, the cartridge 100 according to an aspect of the invention includes an upper case 10 and a lower case 20. A fuel pouch 30 is mounted on the lower case 20. However, it is understood that the fuel pouch 30 may be mounted on the upper case 10 instead of on the lower case 20. The fuel pouch 30 is filled with fuel, such as high-concentration methanol. Grooves 10a and 20a fixing a fuel outlet 40 of the fuel pouch 30 are respectively formed in the upper case 10 and the lower case 20. The fuel outlet 40 and a contact pad 50 located on the left side of the fuel outlet 40 are fixed in place when the upper case 10 and the lower case 20 are coupled with each other.

The contact pad 50 forms a signal transmitting path between the cartridge 100 and a fuel cell main body (not shown) on which the cartridge 100 is installed during operation. When the cartridge 100 is installed on the fuel cell main body, specifications of the cartridge 100, such as a fuel concentration, a manufacturing date, and a manufacturer, are transmitted to a control portion (not shown) of the fuel cell main body through the contact pad 50. Also, information about the residual fuel in the cartridge 100 is directly transmitted to the control portion of the fuel cell main body in real time through the contact pad 50. For these transmissions, a plurality of contact areas or channels 50a, 50b, and 50c are provided in the contact pad 50. A voltage is supplied from the fuel cell main body to the cartridge 100 through the contact area 50a. An output voltage from a variable resistor 60 is transmitted from the cartridge 100 to the fuel cell main body through the contact area 50b. Also, a voltage across a reference resistor (not shown) connected to the variable resistor 60 or a resistance value of the reference resistor is transmitted from the cartridge 100 to the fuel cell main body through the contact area 50c. Each different type of cartridge 100 may have a different reference resistor. Therefore, it is possible to determine specifications of a cartridge 100, such as a maximum fuel capacity, a fuel concentration, and a fuel pressure, using the voltage across the reference resistor or the resistance value of the reference resistor. When the upper case 10 and the lower case 20 are coupled with each other, the upper portion of the contact pad 50 is inserted in a groove 10b formed in the upper case 10, leaving the contact areas 50a, 50b, and 50c exposed. The variable resistor 60 is provided on the right side of the fuel outlet 40 of the fuel pouch 30. The variable resistor 60 includes a support 60a and a variable resistive material layer (plate) 60b attached to or deposited on a surface of the support 60a and contacted by a probe sensor 90, which will be described in detail below. Hereinafter, for convenience of explanation, the support 60a and the variable resistive material layer (plate) 60b will not be referred to individually, but will be referred to collectively as the variable resistor 60.

The variable resistor 60 is perpendicular to the bottom surface of the lower case 10 and simultaneously in close contact with an edge wall of the lower case 20. The variable resistor 60 is provided in an otherwise unused small area between the edge wall of the lower case 20 and the fuel pouch 30. Thus, the addition of the variable resistor 60 does not increase the volume of the cartridge 100, and the resulting structure is not particularly complicated. The lower portion of the variable resistor 60 may be mounted on the lower case 20 while the upper portion thereof may be mounted on the upper case 10. However, it is understood that the variable resistor 60 may be mounted in other ways, positions, and/or orientations, and may have configurations other than the specific configuration shown in FIG. 1. When the cartridge 100 is installed on the fuel cell main body, a voltage is applied to the variable resistor 60 through the contact pad 50. Wiring (not shown) to apply this voltage may be provided, for example, under the fuel outlet 40 of the fuel pouch 30. A pressing plate 70 contacts the fuel pouch 30. The pressing plate 70 transmits pressure received from a pressing spring 80 contacting the pressing plate 70 to the fuel pouch 30. The pressing plate 70 covers most of the upper surface of the fuel pouch 30 except for the fuel outlet 40. Thus, the elastic force of the pressing spring 80 can be effectively transmitted against the fuel pouch 30 through the pressing plate 70. Thus, when the cartridge 100 is installed on the fuel cell main body, the fuel can be instantly supplied from the cartridge 100 to the fuel cell main body. However, it is understood that the pressing plate 70 and the pressing spring 80 may be provided below the fuel cell pouch 30, or on any side of the fuel pouch 30, instead of above the fuel cell pouch 30 as shown in FIG. 1. Also, although the pressing plate 70 and the pressing spring 80 are one example of a pressing unit according to an aspect of the invention, it is understood that any other type of pressing unit that applies an elastic force to the fuel pouch 30 may be used instead of the pressing plate 70 and the pressing spring 80.

Although the pressing spring 80 provided between the pressing plate 70 and the upper case 10 is shown as a circular spring having a radius gradually increasing toward the upper case 10, it may be a rectangular spring, or may be a spring having a radius decreasing toward the upper case 10, or may have any other suitable configuration. Also, the pressing spring 80 may be replaced by a plurality of pressing springs having the same or similar characteristics.

The probe sensor 90 is mounted in the pressing plate 70 so that a protruding portion of the probe sensor 90 protrudes from the pressing plate 70 to contact the variable resistor 60. The probe sensor 90 is mounted to be at the same level as the pressing plate 70 and to move with the pressing plate 70. Since the protruding portion of the probe sensor 90 contacts the variable resistor 60, the height of the variable resistor 60 can be at least as high as the height of the pressing plate 70 at which the fuel pouch 30 is fully filled with fuel. The probe sensor 90 contacting the variable resistor 60 measures the resistance of the variable resistor 60. The resistance measured by the probe sensor 90 is transmitted to the control portion of the fuel cell system through the contact pad 50. As the cartridge 100 supplies fuel to the fuel cell main body, the height of the fuel pouch 30 decreases, and accordingly the height of the probe sensor 90 decreases with the decrease in the height of the pressing plate 70. Accordingly, the position where the probe sensor 90 contacts the variable resistor 60 changes so that the resistance of the variable resistor 60 measured by the probe sensor 90 decreases.

Figure 2:
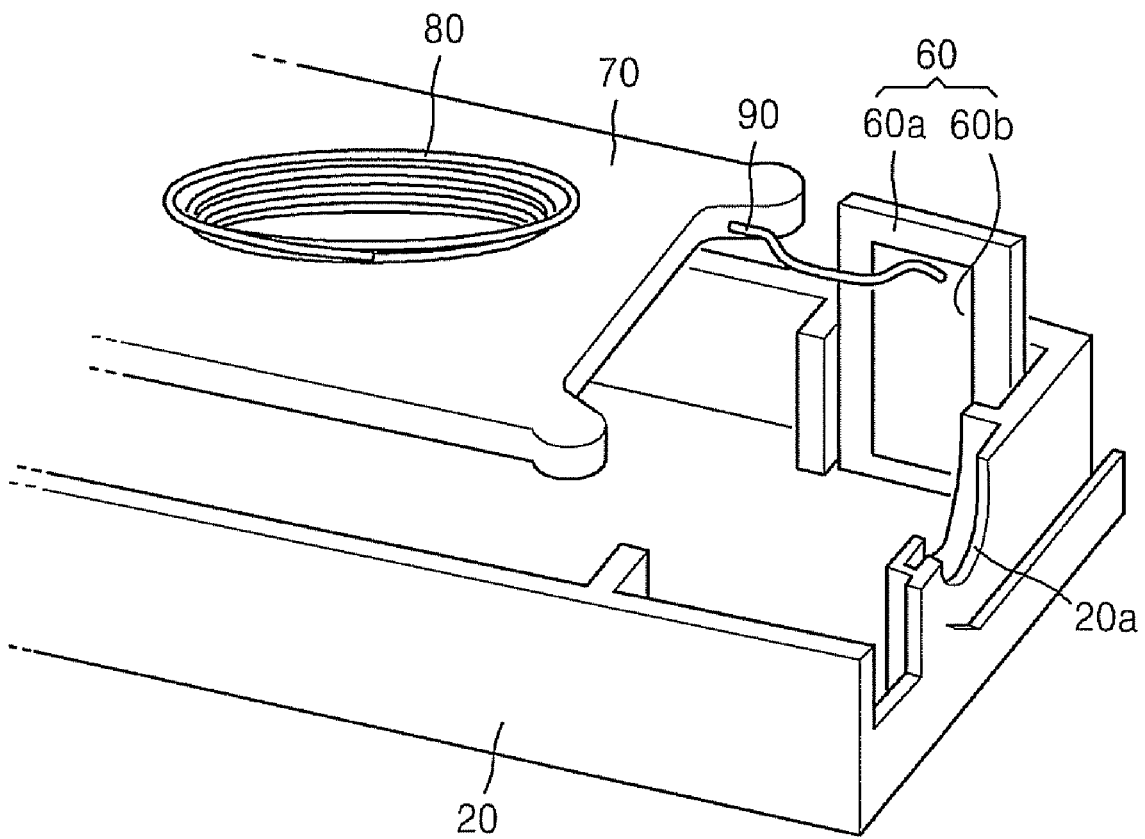
FIG. 2 is a perspective view showing a position where a probe sensor contacts a variable resistor when a fuel pouch of the fuel cell cartridge of FIG. 1 is fully filled with fuel.

FIG. 2 is a perspective view showing the position where the probe sensor 90 contacts the variable resistor 60 when the fuel pouch 30 of the cartridge 100 of FIG. 1 is fully filled with fuel. The fuel pouch 30 is not shown in FIG. 2 for convenience of explanation. Referring to FIG. 2, when the fuel pouch 30 is fully filled with fuel, the probe sensor 90 contacts the upper end of the variable resistor 60. Thus, when the fuel pouch 30 is fully filled with fuel, the resistance of the variable resistor 60 measured by the probe sensor 90 is a maximum.

Figure 3:
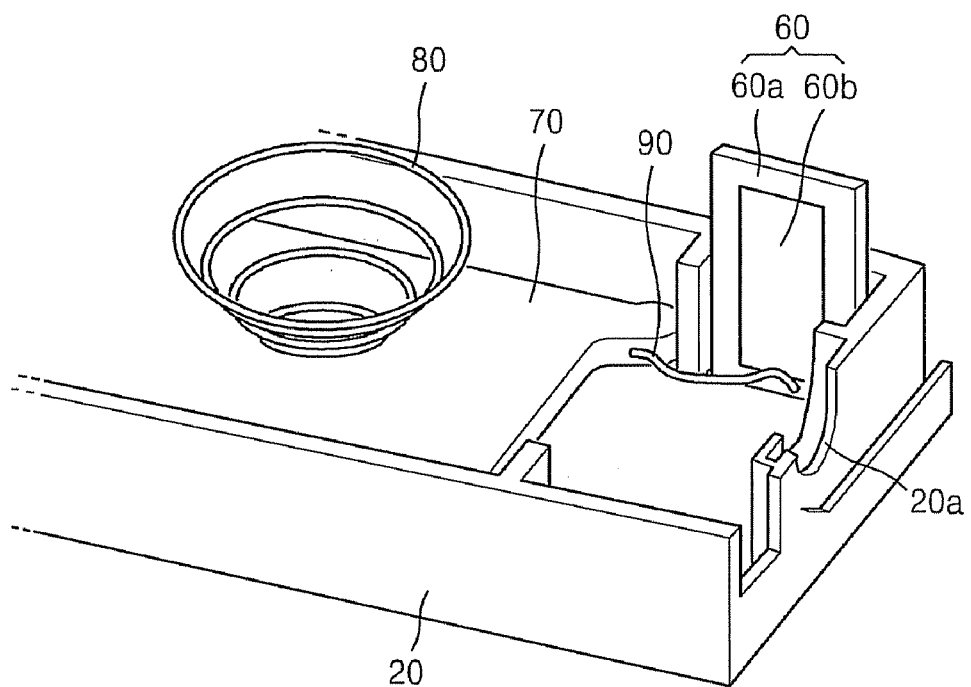
FIG. 3 is a perspective view showing a position where the probe sensor contacts the variable resistor when the fuel pouch of the fuel cell cartridge of FIG. 1 is empty.

FIG. 3 is a perspective view showing the position where the probe sensor 90 contacts the variable resistor 60 when the fuel pouch 30 of the cartridge 100 of FIG. 1 is empty. The fuel pouch 30 is not shown in FIG. 3 for convenience of explanation. Referring to FIG. 3, when the fuel pouch 30 is empty, the probe sensor 90 contacts the lower end of the variable resistor 60. Thus, when the fuel pouch 30 is empty, the resistance of the variable resistor 60 is a minimum.

However, it is understood that the positions of the variable resistor 60 and the probe sensor 90 may be arranged so that when the fuel pouch 30 is fully filled with fuel, the resistance of the variable resistor 60 is a minimum, and when the fuel pouch 30 is empty, the resistance of the variable resistor 60 is a maximum.

It can be seen from FIGS. 2 and 3 that when the fuel pouch 30 is partially filled with fuel, the probe sensor 90 is located between the upper end and the lower end of the variable resistor 60. As the residual fuel in the fuel pouch 30 increases, the probe sensor 90 is located closer to the upper end of the variable resistor 60. As the residual fuel in the fuel pouch 30 decreases, the probe sensor 90 is located closer to the lower end of the variable resistor 60.

Since the position where the probe sensor 90 contacts the variable resistor 60 moves from the upper end to the lower end of the variable resistor 60 in proportion to the amount of the residual fuel in the fuel pouch 30, the resistance of the variable resistor 60 measured by the probe sensor 90 decreases in proportion to the amount of the residual fuel in the fuel pouch 30. However, it is understood that the positions of the variable resistor 60 and the probe sensor 90 may be arranged so that the resistance of the variable resistor 60 measured by the probe sensor 90 increases in proportion to the amount of the residual fuel in the fuel pouch 30.

An electrical signal, such as a voltage signal (an output voltage), varying in proportion to the amount of the residual fuel in the fuel pouch 30 can be obtained using the resistance of the variable resistor 60 measured by the probe sensor 90, due to the above proportional relationship between the amount of the residual fuel in the fuel pouch 30 and the resistance of the variable resistor 60 measured by the probe sensor 90. The voltage signal is transmitted through the contact pad 50 to the control portion of the fuel cell main body on which the cartridge 100 is installed. The voltage signal is compared with data of voltage signal versus residual fuel which was previously input to the fuel cell main body. As a result, the amount of the residual fuel in the fuel pouch 30 of the cartridge 100 can be indicated in real time on a residual fuel display (not shown).

Figure 4:
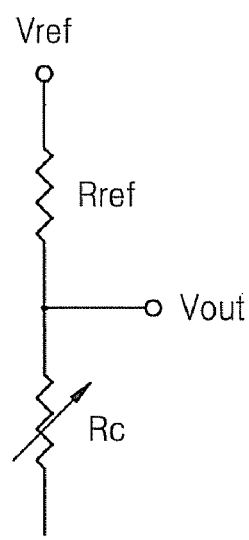
FIG. 4 shows an example of a circuit generating a voltage signal (an output voltage) used for indicating the residual fuel in the cartridge of FIG. 1.

FIG. 4 shows an example of a circuit generating the voltage signal (the output voltage) used for indicating the residual fuel of the cartridge of FIG. 1. In FIG. 4, "Rref" denotes a reference resistance, which is an intrinsic value set for each different type of cartridge. "Rc" denotes a resistance of the variable resistor 60, which is transmitted in real time from the cartridge 100 to the fuel cell main body. "Vref" denotes a voltage that is applied to the variable resistor 60. "Vout" the output voltage, that is, the voltage signal. The output voltage Vout is determined by the following Equation 1:

$$Vout = \frac{Rc}{Rc + Rref} Vref \qquad (1)$$

In Equation 1, as the resistance Rc of the variable resistor 60 increases, that is, as the residual fuel in the fuel pouch 30 increases, the output voltage Vout increases. Conversely, as the resistance Rc of the variable resistor 60 decreases, that is, as the residual fuel in the fuel pouch 30 decreases, the output voltage Vout decreases.

The change of the output voltage Vout directly reflects the residual fuel in the fuel pouch 30. Accordingly, the residual fuel in the fuel pouch 30 can be indicated in real time using the output voltage Vout.

The resistance of the variable resistor 60 when the fuel pouch 30 is empty, that is, when the probe sensor 90 contacts the lower end of the variable resistor 60 (hereinafter referred to as the minimum resistance) can be measured during the cartridge manufacturing process. Also, the resistance of the variable resistor 60 when the fuel pouch 30 is fully filled with fuel, that is, when the probe sensor 90 contacts the upper end of the variable resistor 60 (hereinafter referred to as the maximum resistance) can be measured during the cartridge manufacturing process. The output voltage in Equation 1 with respect to the minimum resistance (hereinafter referred to as the minimum voltage) and the output voltage in Equation 1 with respect to the maximum resistance (hereinafter referred to as the maximum voltage) can be input as set data to the control portion of the fuel cell main body, or to a separate data storing portion controlled by the control portion of the fuel cell main body, in the process of manufacturing the fuel cell main body.

Thus, when the cartridge 100 is installed on the fuel cell main body and used, the control portion of the fuel cell main body indicates the residual fuel in the fuel pouch 30. That is, when the output voltage Vout generated by the circuit of FIG. 4 is the minimum voltage, the control portion of the fuel cell main body determines that the resistance of the variable resistor 60 transmitted from the cartridge 100 to the fuel cell main body is the minimum resistance and that the fuel pouch 30 is substantially empty. Thus, the control portion indicates that the fuel in the fuel pouch 30 of the cartridge 100 is all used up. Also, when the output voltage Vout generated by the circuit of FIG. 4 is the maximum voltage, the control portion of the fuel cell main body determines that the resistance of the variable resistor 60 transmitted from the cartridge 100 to the fuel cell main body is the maximum resistance and that the fuel pouch 30 is full. Thus, the control portion indicates that the fuel pouch 30 is fully filled with fuel.

In the cartridge manufacturing process, not only the minimum resistance and the maximum resistance but also resistances between the minimum resistance and the maximum resistance according to the residual fuel in the fuel pouch 30 are measured. An output voltage according to each of the measured resistances is obtained and input in advance as comparative data to the control portion of the fuel cell main body or the separate data storing portion controlled by the control portion of the fuel cell main body. By doing so, when the cartridge 100 is installed one the fuel cell main body and used, the control portion compares the output voltage Vout generated by the circuit of FIG. 4 with the output voltages that were previously input as the comparative data to the control portion or the separate data storing portion. As a result of the comparison, the amount of the residual fuel in the fuel pouch 30 can be indicated on the residual fuel display.

Figure 5:
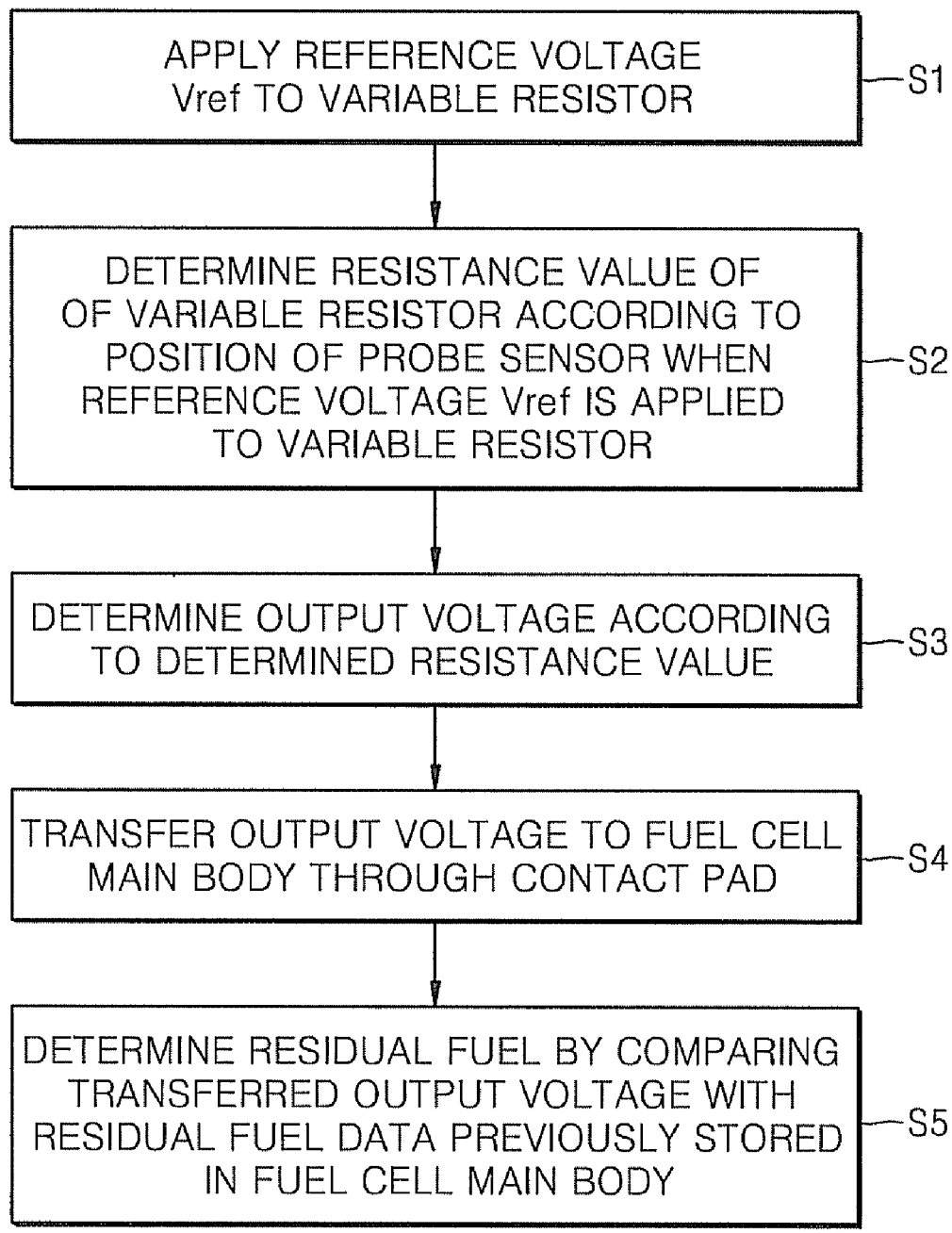
FIG. 5 is a flowchart for explaining a method of measuring the residual fuel of a fuel cell system including the cartridge of FIG. 1.

FIG. 5 is a flowchart for explaining a method of measuring the residual fuel of a fuel cell system including the cartridge of FIG. 1. Referring to FIG. 5, in the measuring method, first, the reference voltage Vref is applied to the variable resistor 60 (S1). The reference voltage Vref is applied from the fuel cell main body to the variable resistor 60 through the contact pad 50 when the cartridge 100 is installed on the fuel cell main body. While the reference voltage Vref is applied to the variable resistor 60, a resistance Rc of the variable resistor 60 according to the position of the probe sensor 90 is measured using the probe sensor 90 (S2). The output voltage Vout corresponding to the resistance Rc is determined according to Equation 1 (S3). The determined output voltage Vout is transmitted to the fuel cell main body through the contact pad 50 (S4). When the output voltage is transmitted to the control portion of the fuel cell, the output voltage is compared with the residual fuel data as a function of output voltage that was previously stored in the control portion of the fuel cell main body or the separate data storing portion controlled by the control portion of the fuel cell main body (S5). As a result of the comparison, the residual fuel in the cartridge 100 is determined and the result of the determination is indicated on the residual fuel display of the fuel cell system. When the measured resistance is the minimum resistance, the residual fuel display indicates that the fuel in the cartridge 100 is used up. When the measured resistance is the maximum resistance, the residual fuel display indicates that the fuel is full in the cartridge 100. When the measured resistance is between the minimum resistance and the maximum resistance, the residual fuel display indicates how much fuel remains in the cartridge 100.

Although several embodiments of the invention have been shown and described, it would be appreciated by those skilled in the art that changes may be made tin these embodiments without departing from the principles and spirit of the invention, the scope of which is defined in the claims and their equivalents. For example, it would be understood by those skilled in the art that the shapes and/or structures of the upper case 10 and the lower case 20 may be changed, and the position and/or shape of the contact pad 50 may be changed. Also, the position and/or shape of the variable resistor 60 and the position and/or shape of the probe sensor 90 may be changed. Also, a variable capacitor or a variable inductor may be used in place of the variable resistor 60. Also, any element having a characteristic that varies as a function of position, or any circuit containing such an element, may be used in place of the variable resistor 60.

As described above, a cartridge according to an aspect of the invention reads the resistance of the variable resistor using the probe sensor that moves with the pressing plate. Since the position of the variable resistor is fixed, the movement of the probe sensor with respect to the variable resistor hardly occurs except when the pressing plate moves. Frictional resistance of the probe sensor contacting the variable resistor is very low and an error due to temperature is low as well.

Therefore, the measurement of the resistance of the variable resistor using the probe sensor according to an aspect of the invention is not affected by changes in the environment in which the cartridge is being used, such as tilting, flipping, rotation, or temperature. Thus, the resistance of the variable resistor can be accurately measured regardless of the environment in which the cartridge is being used.

According to an aspect of the invention, the resistance of the variable resistor reflects the amount of the residual fuel in the fuel pouch so that by using a cartridge according to an aspect of the invention, the amount of the residual fuel in the cartridge can be accurately estimated and the optimal time to replace the cartridge can be accurately estimated. Also, a residual fuel measuring unit according to an aspect of the invention measures the residual fuel without contacting the fuel so that the residual fuel can be measured regardless of the physical and chemical characteristics of the fuel.

Furthermore, since the probe sensor and the variable resistor forming the residual fuel measuring unit of a cartridge according to an aspect of the invention have simple structures and the volume thereof is relatively small compared to the overall size of the cartridge, they can be provided in an otherwise unused small area of the cartridge so that the internal space of the cartridge can be used efficiently. Also, since the residual fuel measuring unit of a cartridge according to an aspect of the invention is not directly installed in the fuel pouch and the operational resistance thereof is very small, it does not affect the fuel pouch pressing process.

In addition, since a cartridge according to an aspect of the invention does not need an expensive part such as a pressure sensor to measure the residual fuel, it is economically efficient. Also, since a cartridge according to an aspect of the invention provides in real time the resistance of the variable resistor measured using the probe sensor to the control portion of the fuel cell main body through the contact pad, information on the residual fuel in the cartridge can be provided in real time to the fuel cell main body.

What is claimed is:

1. A fuel cell cartridge comprising:
a fuel pouch to store fuel, the fuel pouch comprising a fuel outlet;
a pressing unit to press the fuel pouch;
a variable resistor provided near the fuel pouch;
a sensor provided on the pressing unit to read a resistance value of the variable resistor; and
a contact pad to transmit an output voltage determined by the resistance value outside the fuel cell cartridge.

2. The fuel cell cartridge of claim 1, wherein the pressing unit comprises:
a pressing plate contacting a surface of the fuel pouch; and
a spring biased against the pressing plate.

3. The fuel cell cartridge of claim 2, wherein:
the spring applies a force to the pressing plate that causes the pressing plate to move as an amount of residual fuel in the fuel pouch changes; and
the sensor is provided on the pressing plate and moves with the pressing plate as the pressing plate moves as an amount of residual fuel in the fuel pouch changes.

4. The fuel cell cartridge of claim 1, wherein the sensor is a probe sensor contacting the variable resistor.

5. The fuel cell cartridge of claim 1, further comprising a reference resistor connected to the variable resistor;
wherein a resistance value of the reference resistor is indicative of specifications of the fuel cell cartridge.

6. A method of measuring an amount of residual fuel in a fuel cell system comprising the fuel cell cartridge of claim I and a fuel cell main body on which the fuel cell cartridge is installed, the fuel cell main body comprising a control portion, the method comprising:

applying a voltage to the variable resistor;

reading a resistance value of the variable resistor using the sensor while the voltage is applied to the variable resistor;

determining an output voltage from the read resistance value of the variable resistor; and transmitting the output voltage to the fuel cell main body through the contact pad.

7. The method of claim 6, further comprising determining the amount of residual fuel by comparing the output voltage with residual fuel data stored in the control portion of the fuel cell main body.

8. The method of claim 7, wherein the determining of the amount of residual fuel comprises generating a voltage signal indicating that the fuel of the fuel cell cartridge is used up when the read resistance value is a minimum resistance.

9. The method of claim 7, wherein the determining of the amount of residual fuel comprises generating a voltage signal indicating that the fuel of the fuel cell cartridge is full when the read resistance value is a maximum resistance.

10. The method of claim 7, wherein the determining of the amount of residual fuel comprises generating a voltage signal indicating that the fuel of the fuel cell cartridge is used up when the read resistance value is a maximum resistance.

11. The method of claim 7, wherein the determining of the amount of residual fuel comprises generating a voltage signal indicating that the fuel of the fuel cell cartridge is full when the read resistance value is a minimum resistance.

12. The method of claim 6, wherein the pressing unit comprises:

a pressing plate contacting a surface of the fuel pouch; and a spring contacting the pressing plate.

13. The method of claim 12, wherein:

the spring applies a force to the pressing plate that causes the pressing plate to move as the amount of residual fuel in the fuel pouch changes; and the sensor provided on the pressing plate moves with the pressing plate as the pressing plate moves as the amount of residual fuel in the fuel pouch changes.

14. The method of claim 6, wherein the sensor is a probe sensor contacting the variable resistor.

15. The method of claim 6, further comprising determining the amount of residual fuel by comparing the output voltage with residual fuel data stored in a separate data storing portion controlled by the control portion of the fuel cell main body.

16. A fuel cell cartridge installable on a fuel cell main body of a fuel cell system, the fuel cell cartridge comprising:

a fuel pouch to store fuel and supply the fuel to the fuel cell main body during operation of the fuel cell system when the fuel cell cartridge is installed on the fuel cell main body; and a variable resistor having a resistance that changes as an amount of the fuel in the fuel pouch changes so as to provide real-time measurement of an amount of residual fuel.

17. The fuel cell cartridge of claim 16, further comprising a probe sensor coupled to the fuel pouch and contacting the variable resistor, thereby coupling the variable resistor to the fuel cell pouch.

18. The fuel cell cartridge of claim 17, wherein:

a dimension of the fuel pouch changes as the amount of residual fuel in the fuel pouch changes;

a position of the probe sensor changes as the dimension of the fuel pouch changes; and the resistance of the variable resistor changes as the position of the probe sensor changes.

19. The fuel cell cartridge of claim 16, further comprising:

a pressing plate contacting a surface of the fuel pouch;

an elastic member biased against the pressing plate to apply an elastic force to the pressing plate so that the pressing plate moves as the amount of residual fuel in the fuel pouch changes; and a probe sensor mounted on the pressing plate and contacting the variable resistor to sense the resistance of the variable resistor;

wherein the variable resistor is positioned relative to the pressing plate such that the resistance of the variable resistor depends on a position of the sensor probe contacting the variable resistor; and wherein the sensor probe is configured to move with the pressing plate as the pressing plate moves as an amount of residual fuel in the fuel pouch changes, thereby causing the resistance of the variable resistor to change as the amount of residual fuel in the fuel pouch changes.

20. The fuel cell cartridge of claim 19, wherein the variable resistor is positioned relative to the pressing plate such that the resistance of the variable resistor has a maximum value when the fuel pouch is full of fuel, and has a minimum value when the fuel pouch is substantially empty of fuel.

21. The fuel cell cartridge of claim 19, wherein the variable resistor is positioned relative to the pressing plate such that the resistance of the variable resistor has a minimum value when the fuel pouch is full of fuel, and has a maximum value when the fuel pouch is substantially empty of fuel.

22. The fuel cell cartridge of claim 16, further comprising a case in which the fuel pouch and the variable resistor are mounted;

wherein a size of the case cannot be reduced if the variable resistor were not mounted in the case.

* * * * *